(12) United States Patent
Martin et al.

(10) Patent No.: US 8,085,911 B2
(45) Date of Patent: Dec. 27, 2011

(54) CENTRAL MONITORING STATION WITH METHOD TO PROCESS CALL BASED ON CALL SOURCE IDENTIFICATION INFORMATION

(75) Inventors: Christopher D Martin, Plainview, NY (US); Narine Boodoosingh, Ozone Park, NY (US); Richard H Hinkson, Plainview, NY (US)

(73) Assignee: Honeywell International Inc., Morristown, NJ (US)

( * ) Notice: Subject to any disclaimer, the term of this patent is extended or adjusted under 35 U.S.C. 154(b) by 1274 days.

(21) Appl. No.: 11/364,374

(22) Filed: Feb. 28, 2006

(65) Prior Publication Data

US 2007/0201625 A1  Aug. 30, 2007

(51) Int. Cl.
*H04M 11/00* (2006.01)
(52) U.S. Cl. .................................. 379/106.03; 379/45
(58) Field of Classification Search .............. 379/37–51, 379/142.01–142.06; 455/556.1
See application file for complete search history.

(56) References Cited

U.S. PATENT DOCUMENTS

| | | | | |
|---|---|---|---|---|
| 5,511,109 A | * | 4/1996 | Hartley et al. | 379/142.01 |
| 5,546,447 A | * | 8/1996 | Skarbo et al. | 379/142.05 |
| 5,629,687 A | * | 5/1997 | Sutton et al. | 340/825.37 |
| 6,324,263 B1 | | 11/2001 | Sherwood et al. | |
| 6,381,307 B1 | | 4/2002 | Jeffers et al. | |
| 6,529,591 B1 | * | 3/2003 | Dosani et al. | 379/106.03 |
| 2005/0146430 A1 | | 7/2005 | Patrick et al. | |
| 2007/0127658 A1 | * | 6/2007 | Gruchala et al. | 379/142.05 |

FOREIGN PATENT DOCUMENTS

| | | |
|---|---|---|
| EP | 0837611 A2 | 4/1998 |
| GB | 2320644 A | 6/1998 |

OTHER PUBLICATIONS

Honeywell MX8000 Central Station, Dec. 2004.
Honeywell MX8000, http://www.security.com/hsce/products/alarm/receivers/30964.html#Product%20Literature.

* cited by examiner

*Primary Examiner* — Curtis Kuntz
*Assistant Examiner* — Maria El-Zoobi
(74) *Attorney, Agent, or Firm* — Barkume & Associates, P.C.

(57) ABSTRACT

A system and a method for processing an incoming telephone call to an alarm system central monitoring station using call source identification data such as caller ID. The alarm system central monitoring station can use the caller ID information transmitted by the telephone company to make decisions as to how to process a call prior to the central monitoring station receiver answering the call. The central monitoring station will process the call by checking if the caller ID information matches caller ID information stored in memory and it will check status information associated with the caller ID information to determine if the call should be disconnected, transferred, or connected. In order to accomplish this the central monitoring station comprises receiving circuits for detecting an incoming telephone call on the telephone line and reading caller ID information associated with the call, switching circuits coupled to the receiving circuitry for transferring the call if necessary, memory for storing status information comprising the caller ID information, and processing circuitry for determining if caller ID information has been stored in the memory, and if it has, then accessing the status information and processing the call as a function of the status information. The central monitoring station may process the call by
1) transferring the call to an invalid alarm call station,
2) connecting the call to a central monitoring station receiver, a second central monitoring station receiver, or a second line of a central monitoring station receiver, or
3) disconnecting the call.

18 Claims, 5 Drawing Sheets

CENTRAL MONITORING STATION WITH METHOD TO PROCESS CALL BASED ON CALL SOURCE IDENTIFICATION INFORMATION

TECHNICAL FIELD

This invention relates to security systems, and in particular to an alarm system central monitoring station that processes an incoming telephone call based on the call source identification information such as caller ID.

BACKGROUND ART

Many different alarm systems, such as burglary, fire, medical emergency, and personal safety, transmit information to central monitoring stations over public telephone lines. When an alarm system calls the central monitoring station, the central monitoring station receiver answers the call, reads the information transmitted over the telephone line from the alarm system panel, and sends the information to an automation computer through a switching network which is controlled by a configuration computer. The information from the alarm system panel is displayed via the automation computer to a monitoring operator (a live person) and may also be printed by a printer. The monitoring operator screens the information and determines the proper action to be taken, which may include calling the police or fire department or security personnel. The time from when the central monitoring station receiver answers the call until the monitoring operator finishes with the call typically takes one to two minutes. Because central monitoring stations generally have multiple receivers that each have 36 telephone lines coming in and thousands of subscribers, there is a need to increase the efficiency of the call answering process so that other alarm calls may be answered in a timely manner.

In addition, there are calls to the central monitoring station that are invalid alarm calls that tie up the telephone lines coming into the receiver and the monitoring operator. An alarm system panel may have a bug in it or a component failure, such as a dead battery, that causes the alarm system panel to call the central monitoring station every 30 seconds, known as a "runaway dialer". This constant calling continues until someone from the alarm system company goes to the site and fixes the alarm system. This may take days, causing the runaway dialer to tie up receiving lines for days. Other calls that may tie up the telephone lines and the monitoring operator include calls not made from an alarm system panel; calls made to the wrong number; calls from non-paying customers; calls from new customers; calls from customers with new telephone numbers; and calls from alarm systems that have an interface problem with the central monitoring station receiver.

It is therefore an object of the present invention to provide a central monitoring station that increases the efficiency of the alarm answering process.

It is a further object of the present invention to provide a method for processing invalid alarm calls that tie up the telephone lines to the central monitoring station and the monitoring operator.

DISCLOSURE OF THE INVENTION

The present invention is a system and a method for processing an incoming telephone call to an alarm system central monitoring station using call source identification information (such as caller ID, DNIS, or ANI). The central monitoring station uses the call source identification information transmitted by the telephone system (typically between the first and second ring of a call) to make decisions as to how to process the call prior to the receiver answering the call. The central monitoring station will process the call by checking if the call source identification information matches call source identification information stored in memory, and it will check status data that may be associated with the call source identification information, also stored in memory, to determine if the call should be disconnected, transferred, or connected to the receiver. Since the receiver only processes valid (legitimate) local alarm system reports, the lines are less likely to be tied up by invalid alarm calls and the efficiency of the alarm answering process is increased.

In order to accomplish this, the central monitoring station includes receiving circuits for detecting an incoming telephone call on the telephone line and reading call source identification information associated with the call, switching circuits coupled to the receiving circuits for transferring the call if necessary, and memory for storing call source identification information and any associated status information. The central monitoring station of the present invention also has processing circuits for determining if the call source identification information has been stored in memory, and when the call source identification information has been stored in memory, then accessing the status information and processing the call as a function of the status information. The central monitoring station may process the call by various ways, such as (1) transferring the call to an invalid alarm call station monitored by a business operator, (2) connecting the call to a receiver, a second receiver, or a second line of a receiver, or (3) terminating (disconnecting) the call. Transferring the call to an invalid alarm call station would likely take place when the call is not from an alarm system panel that does not require special attention. Connecting the call to a receiver would likely take place during a valid (i.e. normal) call from an alarm system panel. Connecting the call to a second receiver or a second line of a receiver would likely take place when there is an interface problem between the alarm system panel and the central monitoring station, and disconnecting the call would likely take place when there is a significant problem such as a runaway dialer. Calls with mismatched call source identification information or calls from non-paying customers may be transferred to an invalid alarm call station monitored by a business operator, or may be connected to the receiver depending on how the central monitoring station is programmed or on how the status information is programmed.

The memory may be programmed with call source identification information and any associated status information in different ways. In a first simplified embodiment, the monitoring operator programs the call source identification information in memory for a subscriber when the monitoring operator determines there is a problem with the subscriber's alarm system, such as a runaway dialer. All subsequent calls to the central monitoring station will have their call source identification information read and compared to the programmed call source identification information. In this embodiment the status information comprises only the call source identification information no other status data. If it matches, the call will be disconnected. If the call source identification information doesn't match, the call is connected to the receiver and processed as a normal alarm call. In this embodiment all call source identification information stored in memory has a problem status that causes the central monitoring station to disconnect the call.

In a second embodiment, the monitoring operator programs the status information in memory to include the call source identification information and additional status data for a subscriber when the monitoring operator determines there is a problem with the subscriber's alarm system. In this embodiment the call may be disconnected or transferred to a business operator depending on how the monitoring operator programs the status information. The status information may include information as to why the call is being transferred (such as a non-paying customer), a time period for how long the disconnecting or transferring should take place, additional call source identification information, and/or information as to where the call should be transferred. This status information may also be transmitted to the location to which the call is transferred.

In a third embodiment, the memory is programmed with status information, that includes call source identification information and status data, for all of its subscribers (regardless of whether a subscriber has been flagged as having some type of problem. In this embodiment, when a call is received, the central monitoring station reads the call source identification information, matches it to stored call source identification information, and reads the status information. If the status information shows an acceptable account status, then the call is processed as a valid alarm call. If the status information shows a problem (such as a runaway dialer), then the call is an invalid alarm call and may be disconnected or transferred. If the call source identification does not match any programmed call source identification information, then the call will be transferred to a business operator and the call is identified as an unknown call source identification call. In the case of an unknown call source identification call, the memory may be revised to include the unknown caller status information. This may be the case for a new subscriber, or a subscriber with a new telephone number. The status information also may include information as to why the call is being transferred, a time period for how long the disconnecting or transferring should take place, a count of valid and/or invalid alarm calls, call source identification information, and/or information as to where the call should be transferred.

In the third embodiment, additional status information such as service tier data may be used to answer the alarm calls differently and/or provide added services. For instance, the alarm call may come from a medical emergency panel which has a "listen-in" feature where the monitoring operator can talk with someone at the site. Other status information may include whether the call source identification information is mismatched or alarm system information previously transmitted is mismatched. This status information may also be transmitted to the location that the call is transferred or connected to.

For all three embodiments, the status information may be updated manually by the monitoring operator or the business operator, or the status information may be updated automatically after a call has been processed. An example of when this may occur would be when a time period has run out (the time period programmed in the status information), when a count is updated after a runaway dialer or a non-paying subscriber has called, or when a new customer has called for the first time.

BEST MODE FOR CARRYING OUT THE INVENTION

Figure 1:
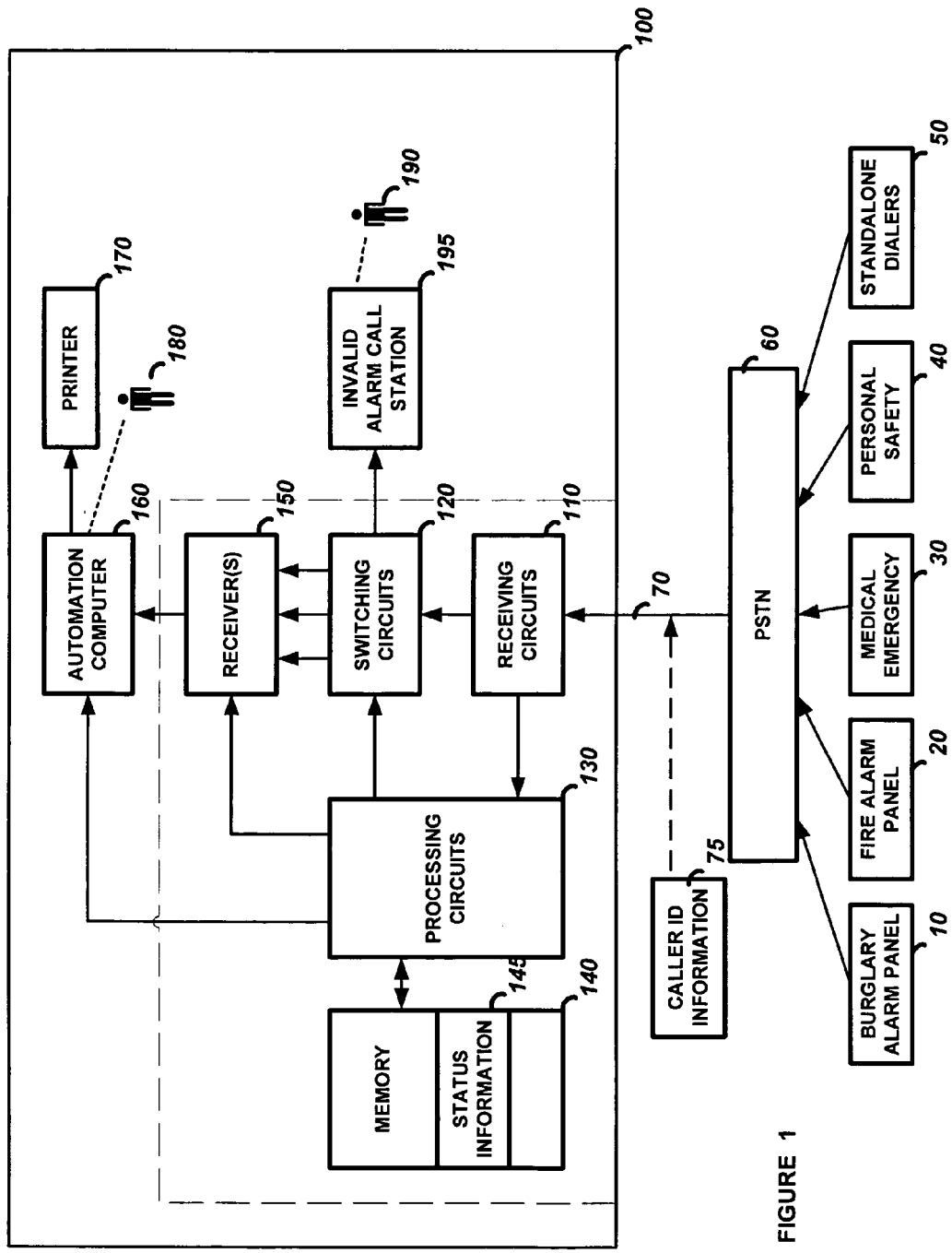
FIG. 1 is a block diagram of the present invention.

FIG. 1 shows a central monitoring station 100 with an input telephone line 70 from the public telephone system 60. Also shown are alarm panels 10-50 which include a burglary alarm 10, a fire alarm 20, a medical emergency alarm 30, a personal safety alarm 40, and a standalone dialer 50. When a burglary, for instance, is taking place, the burglary alarm system would detect the intruder and the burglary alarm panel 10, connected to the public telephone system 60, would dial the central monitoring station 100. The public telephone system 60 would connect the call from the burglary alarm panel 10 to the central monitoring station 100 through telephone input line 70. As the public telephone system 60 makes the connection it transmits call source identification (caller ID) information 75 between the first and second ring of the call. The operation of the public telephone system 60 is well known to one skilled in the art and will not be discussed in detail. The receiving circuits 110 detect the call from telephone input line 70 and read the caller ID information 75. The interface protocol to the burglary alarm panel 10 is determined and the connection is made between the receiver 150 and the burglary alarm panel 10 through the switching circuits 120. This operation is controlled by the processing circuits 130 with inputs from memory 140. The receiver 150 converts the data transmitted from the burglary alarm panel 10 and transmits it to the automation computer 160 along with the caller ID information 75. The automation computer formats the data and displays it to the monitoring operator 180 and prints it with printer 170. At this point the monitoring operator 180 would call the police or a security service. This is a normal operation for answering alarm calls and is well known to one skilled in the art.

The present invention adds an additional component to answering the alarm call. After the receiving circuits 110 read the caller ID information 75 from telephone line 70, the processing circuits 130 use the caller ID information 75 to determine the status of an alarm system (burglary alarm panel 10 for example) from status information 145 stored in memory 140. Based on this status information 145, the processing circuits 130 may cause the switching circuits 120 to connect the call to one of the receiver 150 input lines or to an invalid alarm call station 195 that is operated by a business operator 190, or cause the receiving circuits 110 to disconnect the call. This quick process keeps the lines into the receiver 150 from being tied up by alarm systems that have problems and have transmitted invalid alarm calls. In addition, if a call that is not from an alarm panel 10-50 is connected to telephone line 70 by the public telephone system 60, such as a wrong number, the call may be connected to the invalid alarm call station 195 rather than to the receiver 150. The invalid alarm call station 195 may be for example a PBX system with multiple extensions monitored by many business operators 190.

The system may be programmed to handle private or unknown caller ID calls in different ways. Thus, if the caller ID information is private or unknown, then the call may be either connected to the receiver 150, disconnected, or transferred to a business operator 190.

An additional feature of the present invention is that the status information 145 may be transmitted by the processing circuits 130 to the automation computer 160 or to the invalid alarm call station 195 for improved efficiency in answering calls. The status information 145 may be updated manually by the monitoring operator 180 or the business operator 190, or the status information 145 may be updated automatically by the processing circuits 130. Transmission and updating of the status information 145 may be accomplished in many ways and is well known to one skilled in the art.

Figure 2:
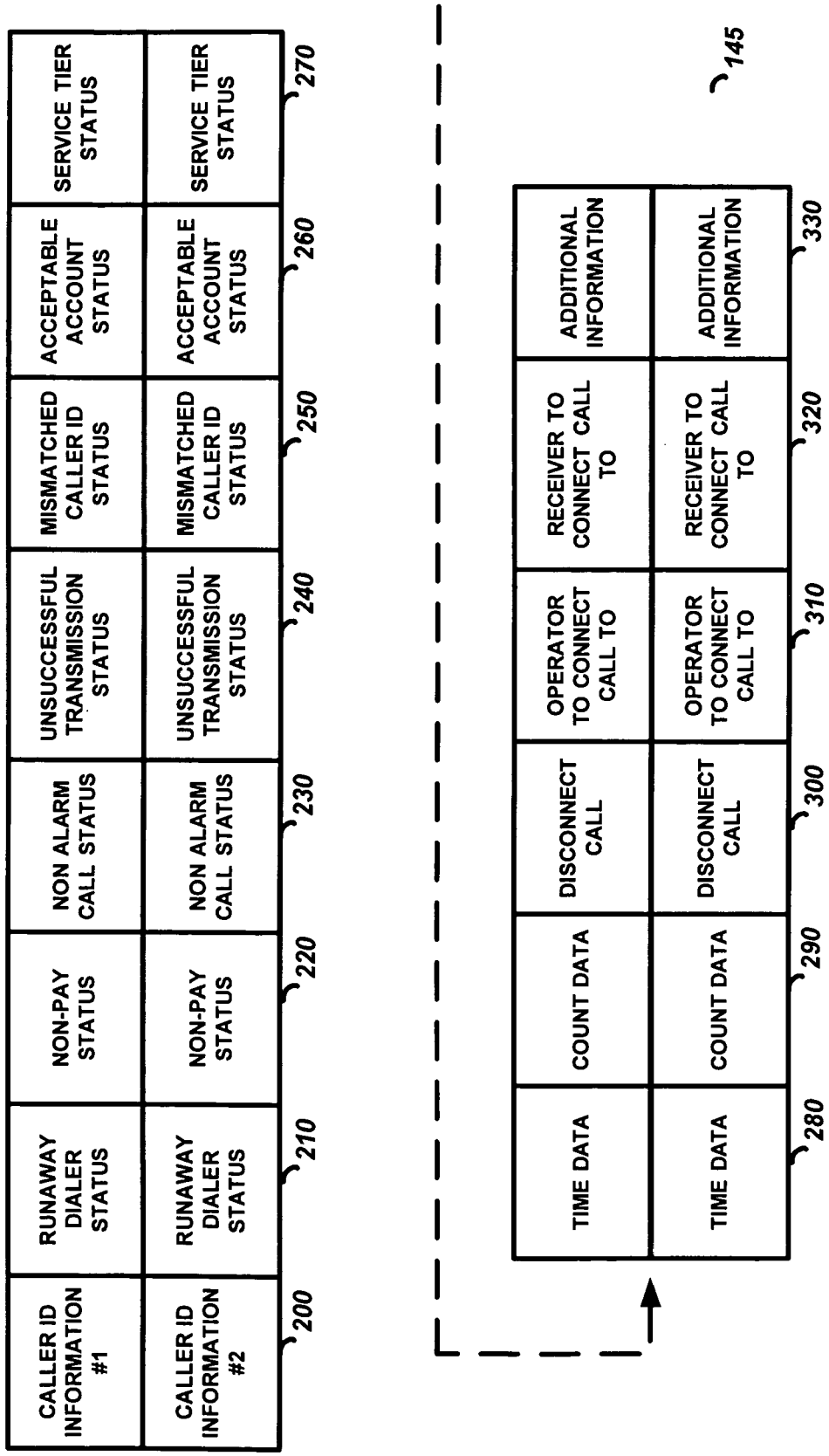
FIG. 2 is a diagram of call source identification information and additional status information stored in memory

FIG. 2 is a diagram of a section of memory that shows how the status information 145 may be stored. Shown is a list of caller ID information 200 and the status bits (or bytes) 210-330 associated with each caller ID information 200. In the first embodiment of the present invention only the caller ID information 200 is stored in memory 140. The status bits 210-330 are not necessary because, in this simplified embodiment, all the alarm systems whose caller ID information 200 has been stored in memory 140 have been previously determined to be invalid (likely a runaway dialer or a non-alarm call) which will cause its telephone calls to be disconnected by the receiving circuits 110 until the memory 140 is reprogrammed. That is, the mere fact that the caller ID is stored in memory (with no other status detail as in the next described embodiments) indicates there is a problem with the calling alarm system. For example, in order to disconnect an invalid alarm call, the call would likely be answered and then immediately disconnected to terminate the call.

In the second embodiment of the present invention the caller ID information 200 and some of the status bits 210-330 will be stored in memory 140 when it has been determined that a particular alarm system has a problem. In this embodiment the call may be disconnected by the receiving circuits 110 or may be transferred by the switching circuits 120 depending on the stored status information 145. The memory 140 may be programmed with the caller ID information 200, the runaway dialer status bit 210 set and disconnect call bit 300 set. In this case a call by the alarm system with this caller ID information 200 will be disconnected by the receiving circuits 110. The memory 140 may be programmed with the caller ID information 200, the non-paying subscriber status bit 220 set and the receiver to connect the call to byte 320 programmed. In this case the alarm call will be transmitted to the receiver 150 whose address is programmed in the receiver byte 320, and the monitoring operator 180 will answer the alarm call but will see that the subscriber is a non-paying subscriber as the status information is transmitted to the monitoring operator 180. Also in this embodiment the memory 140 may be programmed with the caller ID information 200, the unsuccessful transmission status bit 240 set or the mismatch caller ID status bit 250 set, and the operator to connect call to byte 310. In these cases a call by the alarm system with this caller ID information 200 will be transmitted to the invalid alarm call station 195 whose address is programmed in the operator byte 310, and the business operator 190 will see that the subscriber's alarm system or telephone number has been changed. Additionally the memory 140 may be programmed with the caller ID information 200 of a non-subscriber that frequently calls, such as a fax machine. The monitoring operator 180 would set the non-alarm call status bit 230 associated with this caller ID information 200 and possibly the disconnect call status bit 300. Also in this embodiment, the status information 145 may include time data bytes 280 or count data bytes 290 which may keep track of the actual time or the number of times a call is being disconnected or transferred. Other additional information 330 that may be useful to the monitoring operator 180 or the business operator 190 may also be stored.

In the third embodiment the status information 145, which includes the caller ID information 200 and the status bits 210-330, is stored for every subscriber, not just for subscribers with problem alarm systems as in the first two embodiments. Also non-subscriber caller ID information 200 may be stored for frequent non-alarm calls. In addition to the status information 145 described in the second embodiment an acceptable account status bit 260 and a service tier status byte 270 may be stored. The service tier status byte 270 may signal to the monitoring operator 180 that additional services may be needed for that subscriber.

Figure 3:
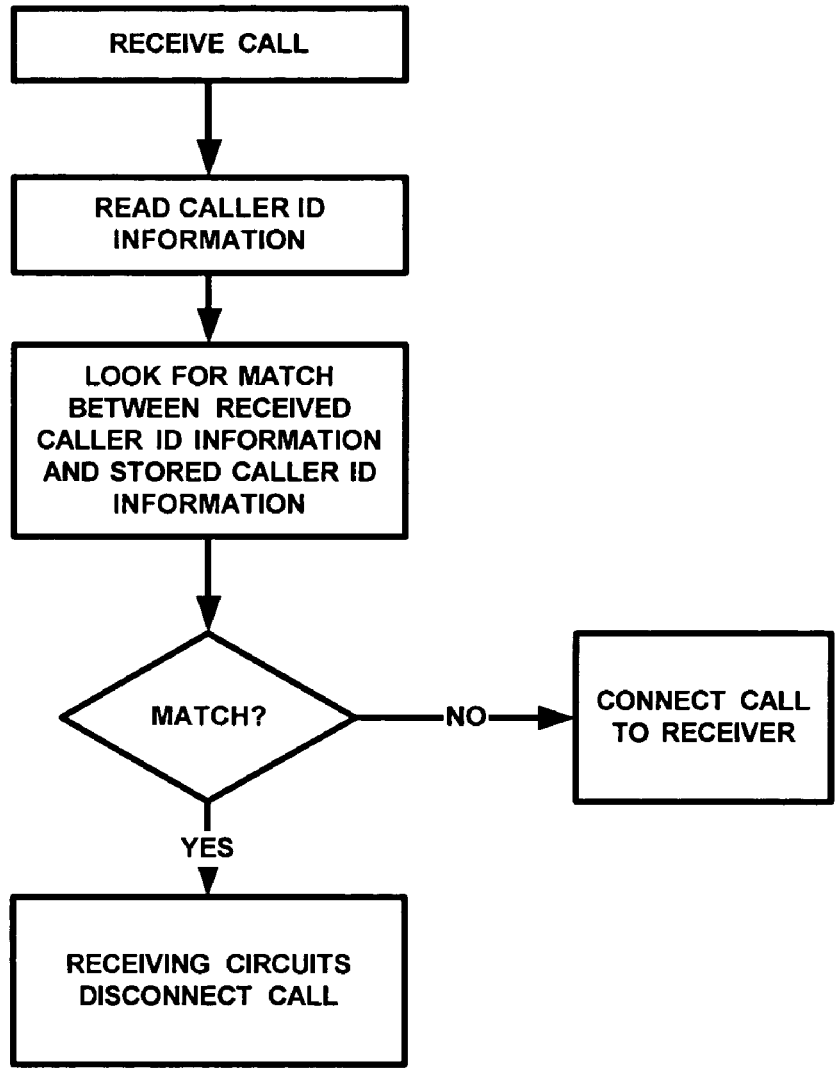
FIG. 3 is a flowchart of the first embodiment of the present invention.

FIG. 3 is a flowchart of the first embodiment of the present invention. In this embodiment the central monitoring station 100 receives a telephone call which is detected by receiving circuits 110. The receiving circuits 110 read the caller ID information 75, and the processing circuits 130 look for a match between the received caller ID information 75 and the caller ID information 200 stored in memory 140. If a match is not found, the processing circuits 130 cause the switching circuits 120 to connect the call to the receiver 150. If there is a match, signifying a problem with the transmitting alarm system, the processing circuits 130 cause the receiving circuits 110 to simply disconnect the call as previously described.

Figure 4:
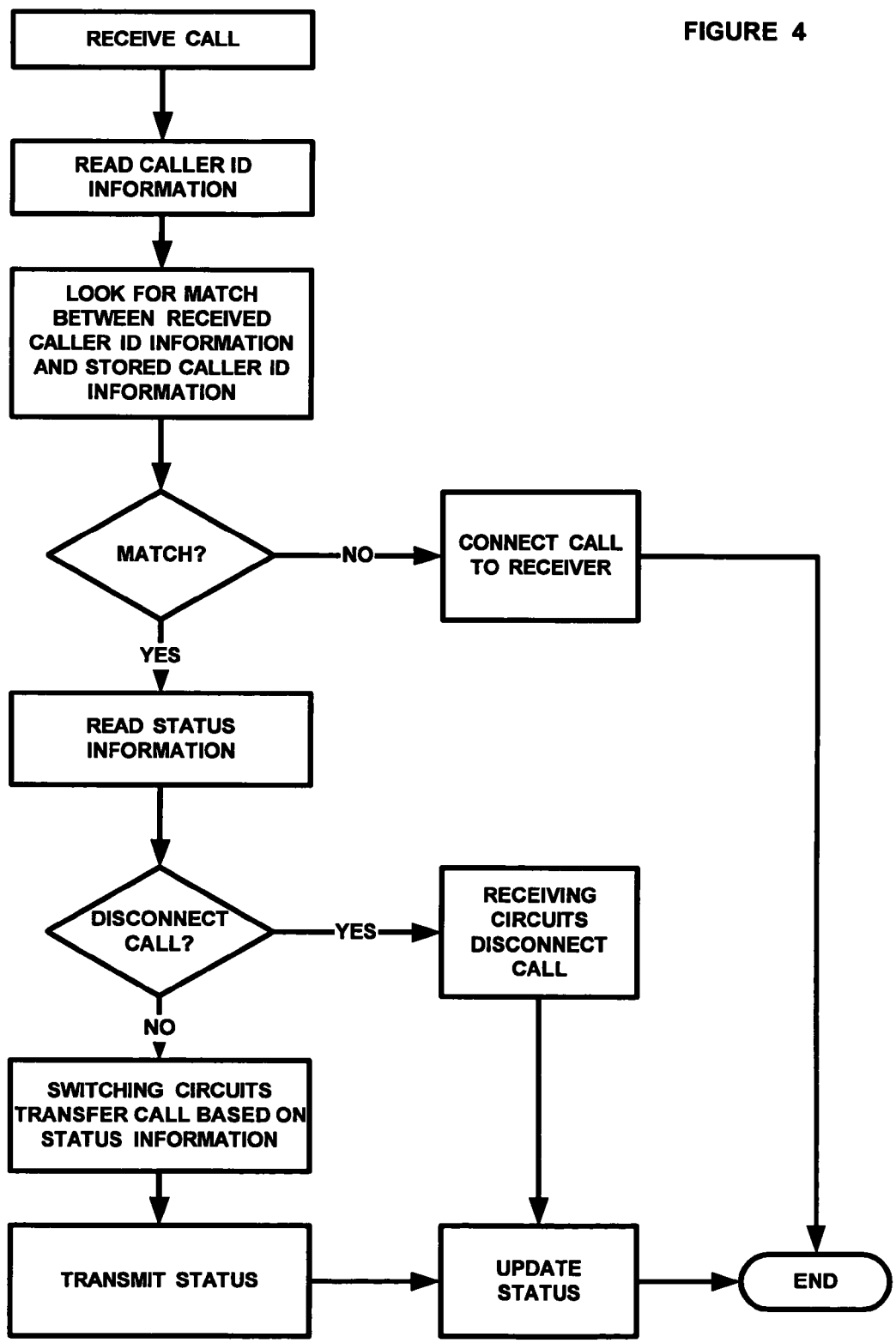
FIG. 4 is a flowchart of the second embodiment of the present invention.

FIG. 4 is a flowchart of the second embodiment of the present invention in which more detailed status information is stored with the caller ID. In this embodiment the central monitoring station 100 receives a telephone call which is detected by receiving circuits 110. The receiving circuits 110 read the caller ID information 75, and the processing circuits 130 look for a match between the received caller ID information 75 and the caller ID information 200 stored in memory 140. If a match is not found, the processing circuits 130 cause the switching circuits 120 to connect the call to the receiver 150. If there is a match, the processing circuits 120 read the status bits 210-330 associated with the caller ID information 200. If the processing circuits 120 determine the call should be disconnected based on the status information 145, then the processing circuits 130 cause the receiving circuits 110 to disconnect the call and the status information 145 is updated if necessary. If the call is not connected to receiver 150 and not disconnected, then it is transferred based on the status information 145. The status information 145 may also be transmitted by the processing circuits 130 to the location where the call is transferred and is updated if necessary.

Figure 5:
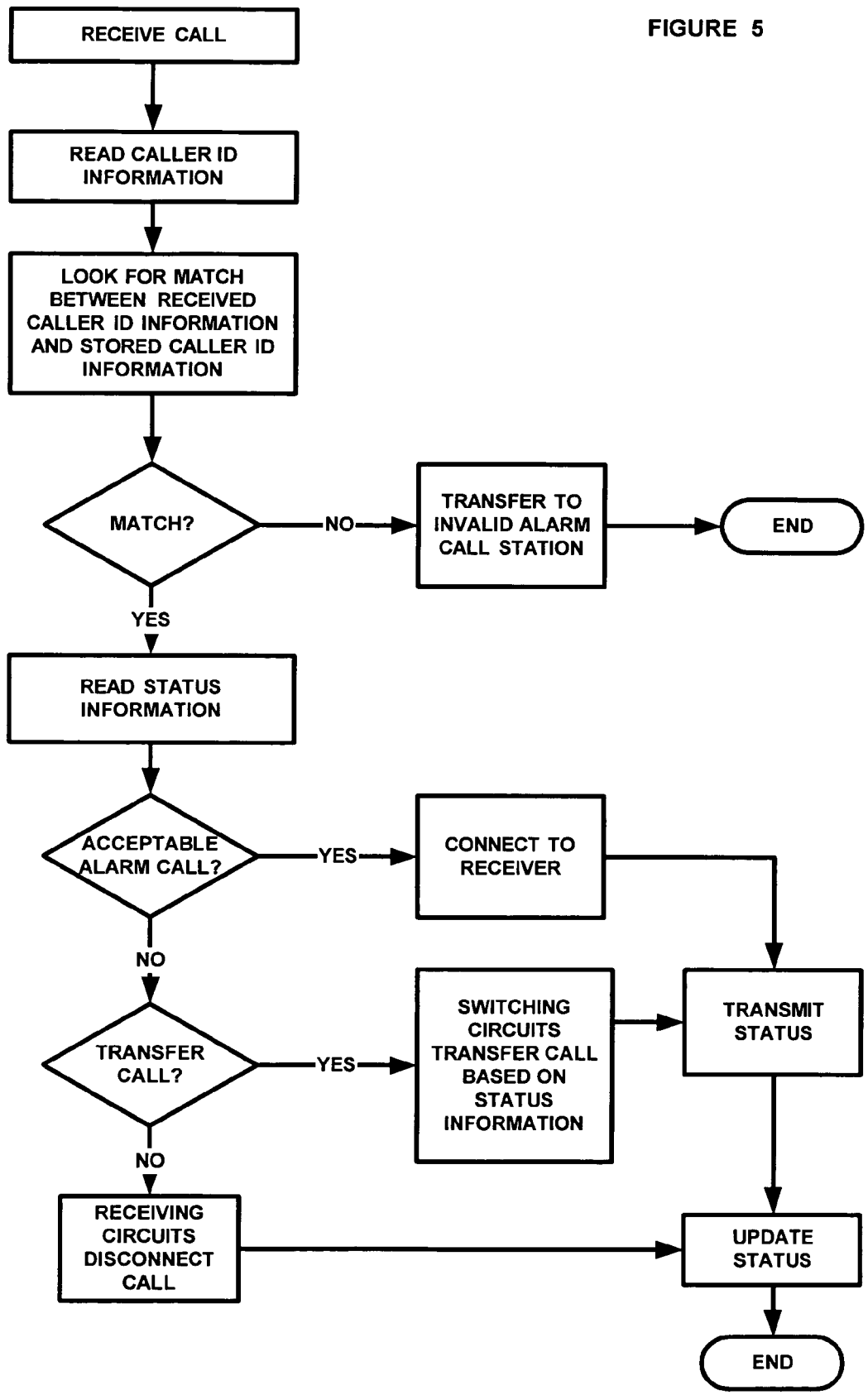
FIG. 5 is a flowchart of the third embodiment of the present invention.

FIG. 5 is a flowchart of the third embodiment of the present invention. In this embodiment the central monitoring station 100 receives a telephone call which is detected by receiving circuits 110. The receiving circuits 110 read the caller ID information 75 and the processing circuits 130 look for a match between the received caller ID information 75 and the caller ID information 200 stored in memory 140. If a match is not found, the processing circuits 130 cause the switching circuits 120 to connect the call to the invalid alarm call station 195. The business operator 190 will determine if the status information 145 should be programmed into memory 140. If there is a match, the processing circuits 120 read the status bits 210-330 associated with the caller ID information 200. If the processing circuits 120 determine the call is a valid alarm call, the processing circuits 130 cause the switching circuits 120 to connect the call to the receiver 150 and transmit the status information 145. The status information 145 is also updated if necessary. If the processing circuits 130 determine the call is to be transferred, the processing circuits 130 cause the switching circuits 120 to transfer the call based on the status information 145. The status information 145 may also be transmitted by the processing circuits 130 to the location where the call is transferred and is updated if necessary. If the call is not connected to the receiver 150 or transferred, the processing circuits 130 cause the receiving circuits 110 to disconnect the call. The status information 145 may also be updated if necessary.

It will be apparent to those skilled in the art that modifications to the specific embodiment described herein may be made while still being within the spirit and scope of the present invention. For example, the status information 145 may comprise different information or may be programmed differently in memory. Processing of a call may be handled differently, for instance, rather than disconnection the call in the first embodiment, the call may be transferred. In addition the invalid alarm call station may comprise a switch board with multiple business operators or may comprise an answering machine. As shown in FIG. 1, various components of the invention may be carried out by multiple devices or by a single device as shown by the dotted line.

What is claimed is:

1. A method of processing an incoming telephone call from an alarm panel to an alarm system central monitoring station, the alarm system central monitoring station comprising a plurality of receivers, said call comprising call source identification data, the method comprising the steps of:
   a. receiving said call at the alarm system central monitoring station,
   b. prior to answering said call,
      reading said call source identification data associated with said call,
   c. determining if the call source identification data has been previously stored in a memory, and
      (i) if it is determined that the call source identification data has been previously stored in the memory, then routing said call to one of said plurality of receivers whose address is programmed in status information associated in the memory with said call source identification data, and
      (ii) if it is determined that the call source identification data has not been previously stored in the memory, then routing said call to an invalid alarm call station.

2. The method of claim 1 wherein said call source identification data is caller identification (caller ID) information.

3. The method of claim 1 further comprising the step of updating said stored status information.

4. The method of claim 3 wherein the step of updating said stored status information is performed automatically after processing said call.

5. The method of claim 1 wherein the status information comprises runaway dialer status.

6. The method of claim 1 wherein the status information comprises non-paying customer account status.

7. The method of claim 1 wherein the status information comprises non-alarm call status.

8. The method of claim 1 wherein the status information comprises unsuccessful data transmission status.

9. The method of claim 1 wherein the status information comprises acceptable account status.

10. The method of claim 1 wherein the status information comprises service tier status.

11. The method of claim 1 wherein the status information comprises time data.

12. The method of claim 1 wherein the status information comprises count data.

13. The method of claim 1 wherein the status information comprises processing information.

14. A central monitoring station system connected to at least one telephone line and comprising:
   a. receiving circuitry adapted to:
      i. detect an incoming telephone call on said telephone line, and
      ii. prior to answering said call, read call source identification data associated with said call,
   b. memory adapted to store call source identification data and status information associated with said call source identification data,
   c. a plurality of receivers; and
   d. processing circuitry adapted to determine if the call source identification data has been previously stored in the memory, and:
      i. if the processing circuitry determines that said call source identification data has been previously stored in the memory, then route said call to one of said plurality of receivers whose address is programmed in the status information associated in the memory with the call source identification data, and
      ii. if the processing circuitry determines that said call source identification data has not been previously stored in the memory, then route said call to an invalid alarm call station.

15. The system of claim 14 wherein said call source identification data is caller identification information.

16. The system of claim 14 wherein said processing circuitry is further adapted to transmit said status information when processing said call.

17. The system of claim 14 wherein said processing circuitry is further adapted to update said status information stored in memory.

18. The system of claim 14 wherein said processing circuitry is further adapted to store status information associated with said call source identification data if said processing circuitry determines said status information has not been stored in the memory.

* * * * *